United States Patent [19]
Smith et al.

[11] Patent Number: 5,704,596
[45] Date of Patent: Jan. 6, 1998

[54] VIBRATION ISOLATION SYSTEM

[75] Inventors: Michael Reaugh Smith, Bedford; Frank Bradley Stamps, Hurst, both of Tex.

[73] Assignee: Bell Helicopter, Fort Worth, Tex.

[21] Appl. No.: 785,698

[22] Filed: Jan. 17, 1997

Related U.S. Application Data

[60] Continuation of Ser. No. 357,715, Dec. 16, 1994, abandoned, which is a division of Ser. No. 108,978, Aug. 18, 1993, Pat. No. 5,435,531.

[51] Int. Cl.$^6$ ............................................. F16F 9/10
[52] U.S. Cl. .................. 267/140.11; 188/285; 188/378; 267/140.13; 267/219
[58] Field of Search .................. 188/378, 379, 188/266, 380, 298, 311, 313, 314, 285–288; 267/136, 140.11–140.15, 113, 118, 122, 219, 220, 140.5, 124–127; 138/40, 45, 46; 251/7–8; 244/54; 248/550, 636, 631, 562, 638; 180/300, 312, 902

[56] References Cited

U.S. PATENT DOCUMENTS

| | | | |
|---|---|---|---|
| 1,010,747 | 12/1911 | Gray | 188/285 |
| 1,313,763 | 8/1919 | Thomas | 188/287 |
| 1,821,988 | 9/1931 | Rowles | 188/298 X |
| 2,088,875 | 8/1937 | Serste | 188/288 |
| 2,317,028 | 4/1943 | Chappell et al. | 188/298 X |
| 2,579,334 | 12/1951 | Plank | 188/298 X |
| 4,720,084 | 1/1988 | Hollerweger et al. | 267/140.13 |
| 4,760,996 | 8/1988 | Davis | 188/298 |
| 4,768,759 | 9/1988 | Bellamy et al. | 267/140.13 |
| 4,848,495 | 7/1989 | Hayashi | 188/298 |
| 5,205,546 | 4/1993 | Schisler et al. | 267/140.13 |
| 5,318,156 | 6/1994 | Davis | 188/298 |
| 5,332,070 | 7/1994 | Davis et al. | 188/298 |
| 5,368,140 | 11/1994 | Takano et al. | 188/298 |
| 5,370,375 | 12/1994 | Kujima | 267/219 |
| 5,401,009 | 3/1995 | Cunningham et al. | 118/298 |
| 5,435,531 | 7/1995 | Smith et al. | 267/140.13 |

*Primary Examiner*—Douglas C. Butler
*Attorney, Agent, or Firm*—John M. Cone; Strasburger & Price L.L.P.

[57] ABSTRACT

A vibration isolation system comprises four tunable dual-axis hydraulic inertial isolators, an array of accelerometers, and a controller. The controller inputs signals from the accelerometers and outputs signals to tune the isolators to minimize the vibration transmitted from a vibrating body to an isolated body. The isolators are tuned by varying the dimensions of their tuning passages or by application of magnetohydrodynamic force to the liquid within the tuning passages.

14 Claims, 5 Drawing Sheets

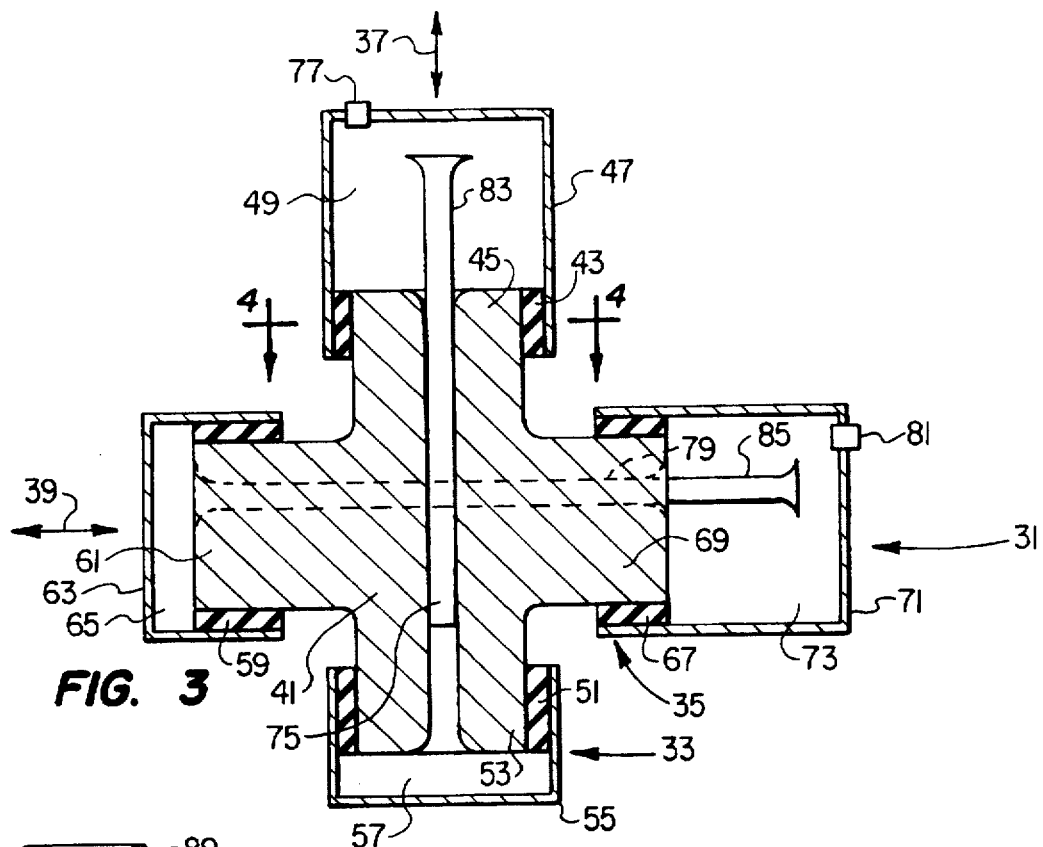
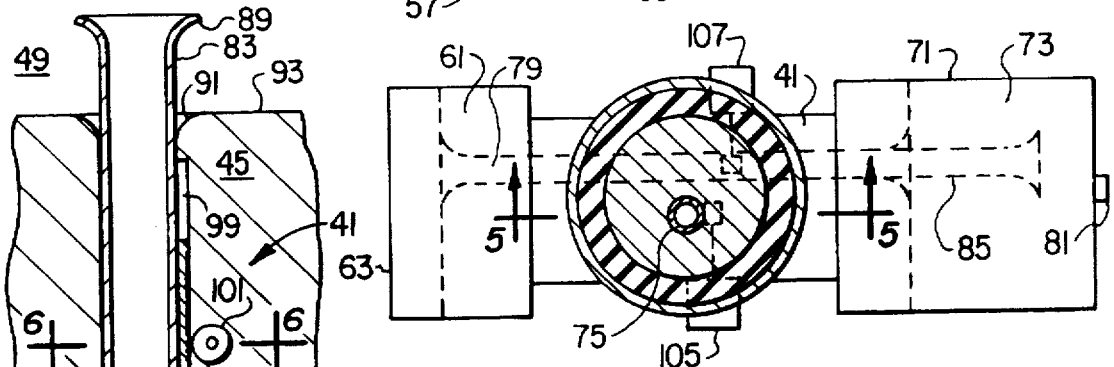
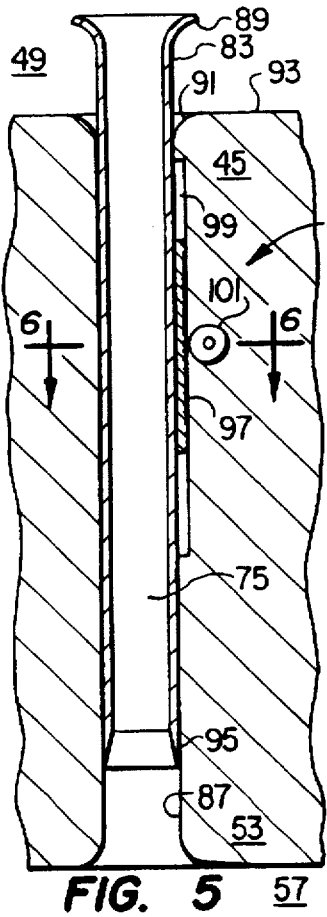
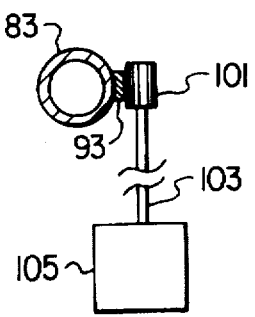
FIG. 3
FIG. 4
FIG. 5
FIG. 6

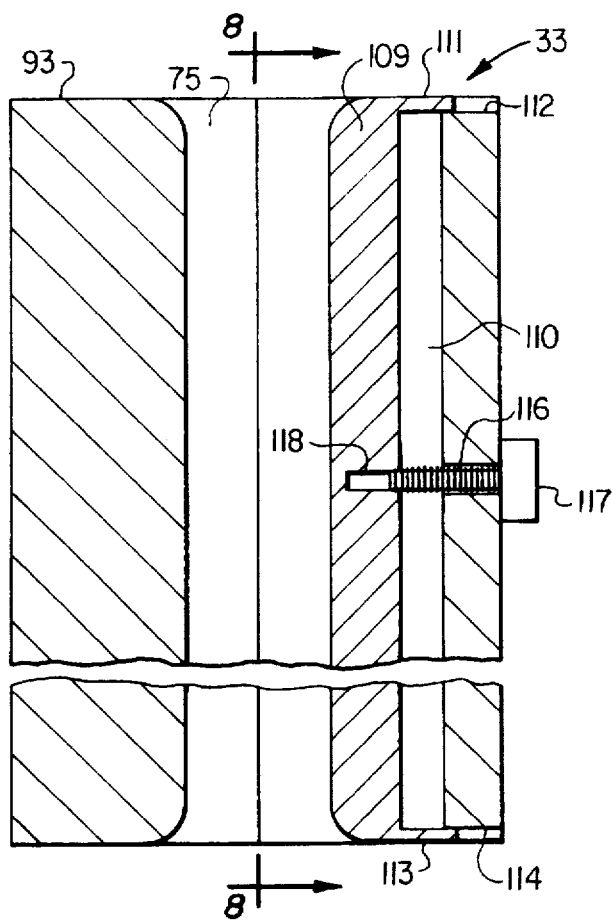
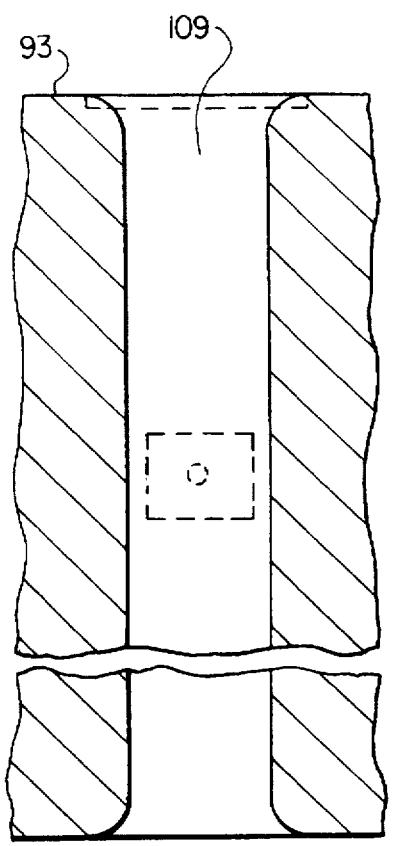
FIG. 7  FIG. 8
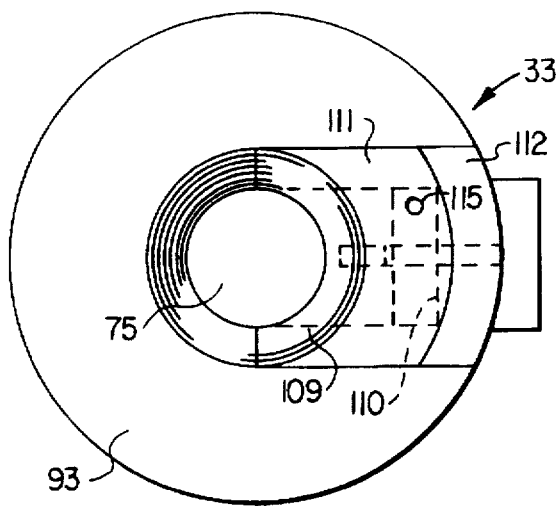
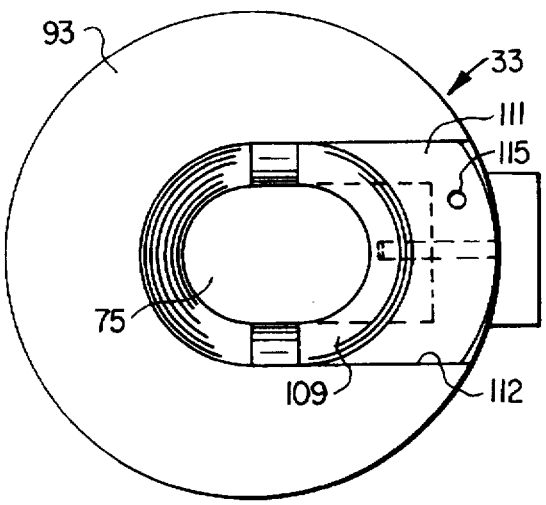
FIG. 9  FIG. 10

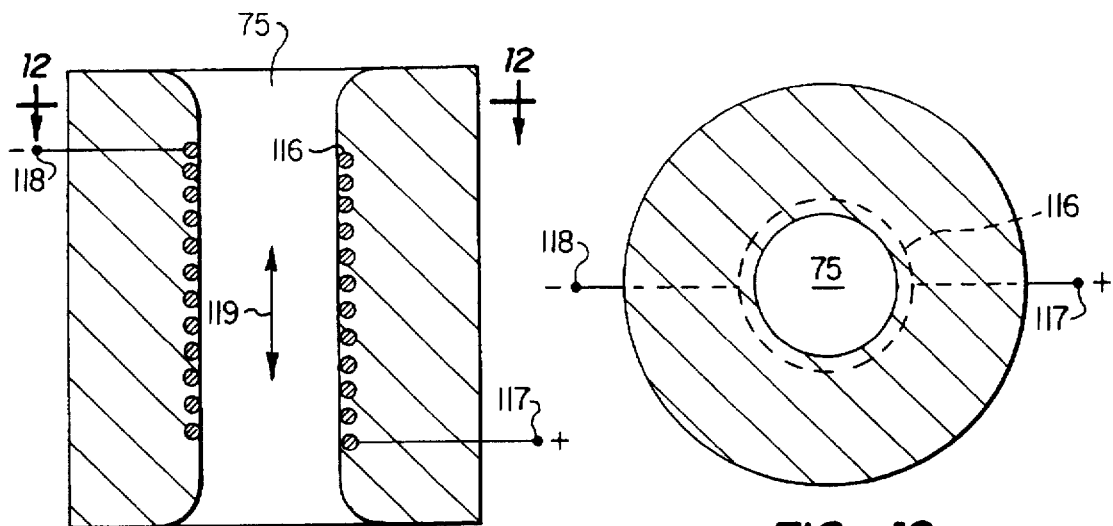
FIG. 11
FIG. 12
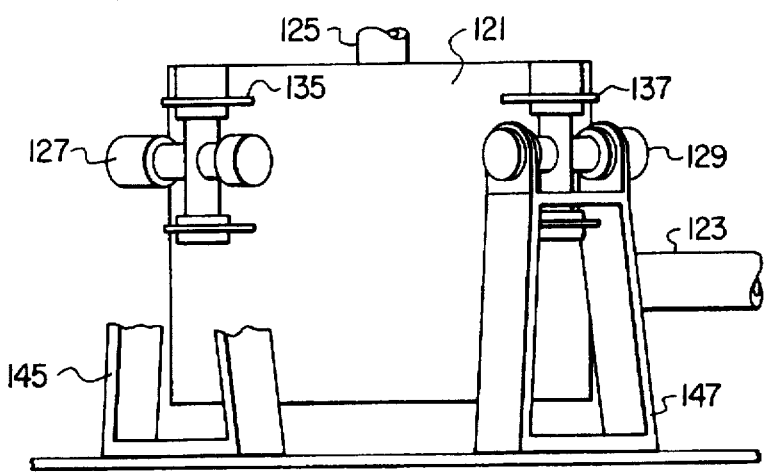
FIG. 13
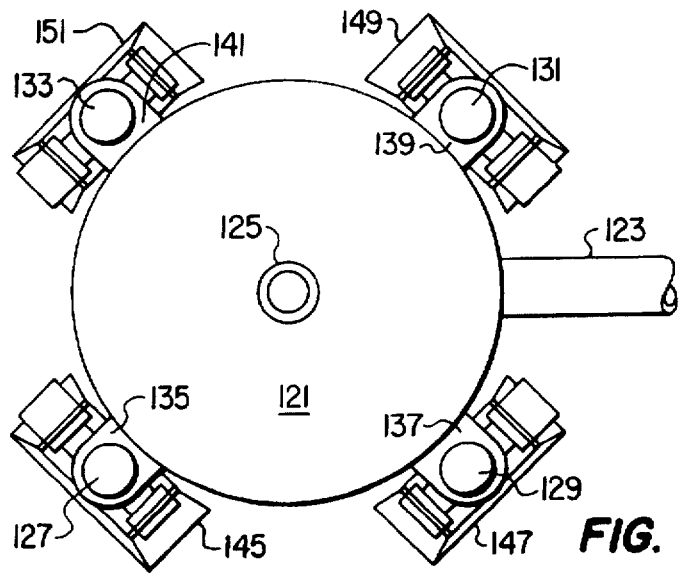
FIG. 14

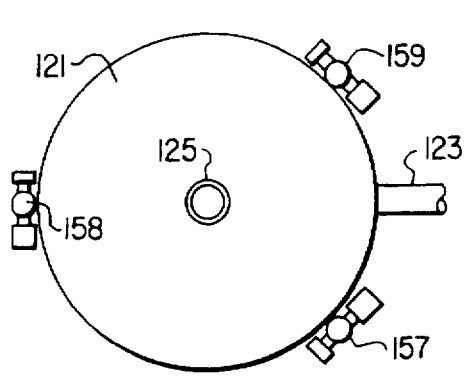
FIG. 15
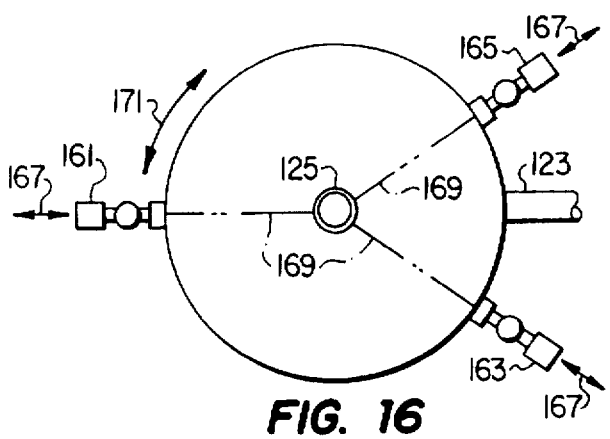
FIG. 16
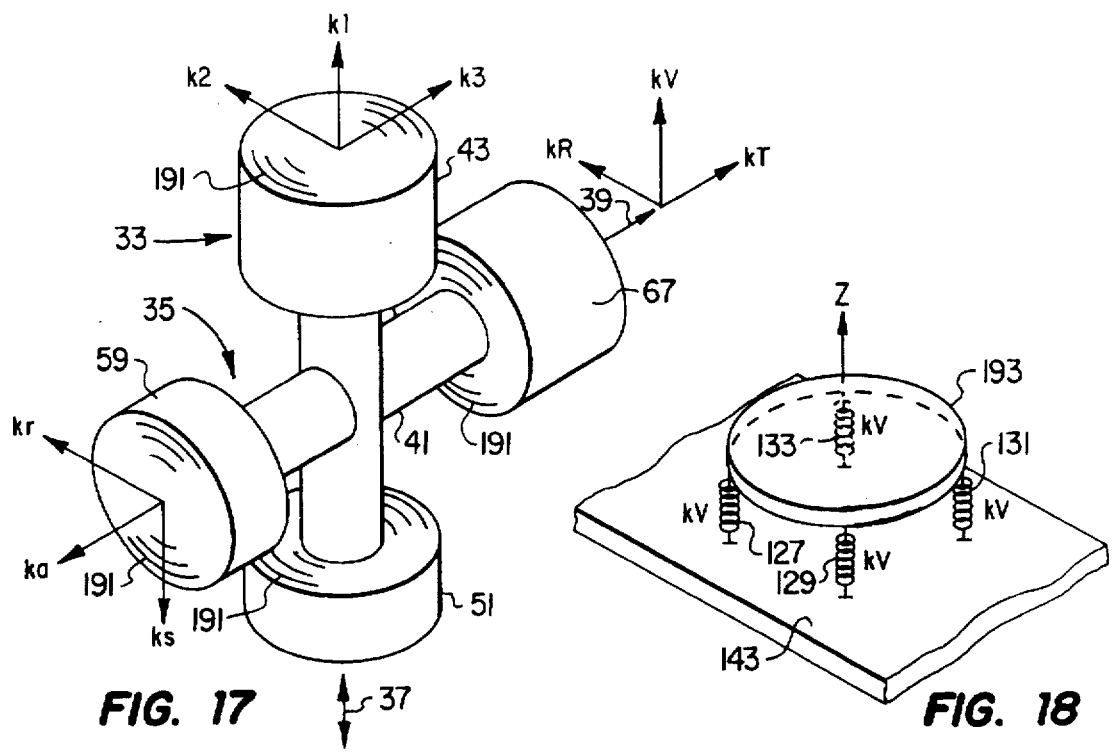
FIG. 17
FIG. 18
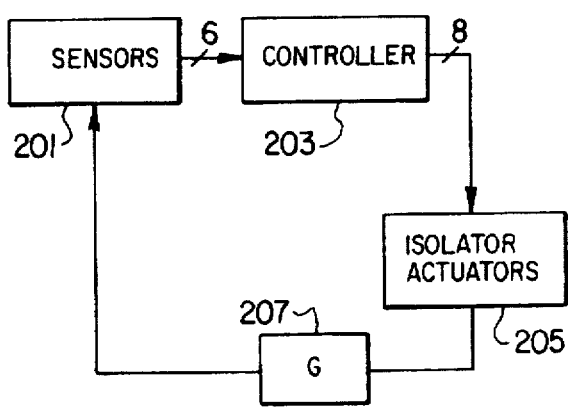
FIG. 20
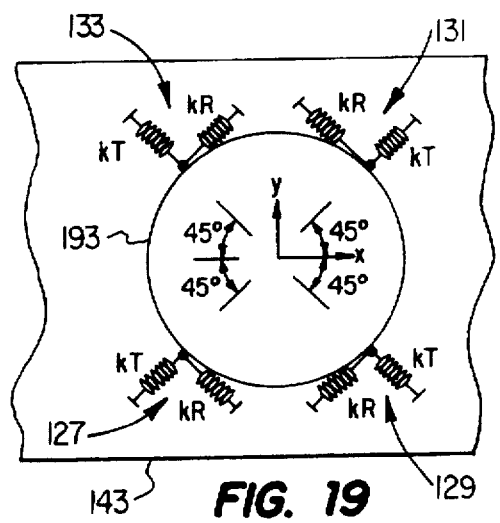
FIG. 19

VIBRATION ISOLATION SYSTEM

This application is a continuation of application Ser. No. 08/357,715, filed Dec. 16, 1994, now abandoned, which is a division of application Ser. No. 08/108,978, filed Aug. 18, 1993, now U.S. Pat. No. 5,435,531.

BACKGROUND OF THE INVENTION

The present invention relates to a system which minimizes the transfer of vibration forces and moments from a vibrating body to a body attached thereto.

Vibration in helicopters causes many undesirable effects. These include: crew fatigue, resulting in decreased proficiency; unacceptable passenger discomfort; decreased component reliability, resulting in increased operating costs; and, in many cases, limited maximum cruising speed.

The main rotor-transmission assembly (the "pylon") is a major source of helicopter vibration. In operation, the rotor causes pylon vibration in all six degrees of freedom; that is, vertical, lateral, and longitudinal forces, and roll, pitch, and yaw moments. The predominant pylon vibration harmonic occurs at the blade passage frequency (the "b/rev frequency"), which is equal to the number of rotor blades times the angular velocity of the rotor.

Early pylon mounting systems resulted in fuselage vibration levels which exceeded 0.5 g. Next, isolation systems using focal isolation mounts were generally able to limit b/rev fuselage vibration at cruise airspeeds to about 0.15 g, but vibration at transition airspeeds (approximately 0 to 25 knots) exceeded that level.

During the 1970's, the U.S. military reduced the b/rev vibration standard to 0.05 g at cruise airspeeds. Several pylon isolation systems which included one or more antiresonant, force-cancelling devices were developed in an attempt to meet that standard. Each of the force-cancelling devices included a spring and a mechanically-amplified tuning mass to partially or completely cancel pylon b/rev vibration in one degree of freedom. Systems combining one or more such force-cancelling devices with focal mounts were able to effect at least partial isolation in up to five degrees of freedom. However, such systems were complex, expensive, required considerable space, and imposed a weight penalty which varied from 2–3% of helicopter design weight; and none of the systems was able to meet the 0.05 g standard.

U.S. Pat. No. 4,236,607 (Halwes et al.) discloses a spring-tuning mass vibration isolator in which force cancellation is accomplished by hydraulically amplifying the inertia of a liquid tuning mass. The Halwes Liquid Inertial Vibration Eliminator ("LIVE") isolator 1 is shown schematically in cross section in FIG. 1. A layer of low-damped rubber 3 is bonded between the outer surface of a piston 5 and the inner surface of a cylinder 7. The rubber 3 acts as an elastomeric spring and as a liquid seal. Upper and lower end caps 9, 11, respectively, are secured to the ends of the cylinder 5 to prevent fluid leakage from the interior thereof, thereby forming two chambers 13, 15. The chambers 13, 15 are connected by a tuning passage 17 in the piston 5, and the chambers 13, 15 and the tuning passage 17 are filled with a high-density, incompressible, low-viscosity fluid such as, for example, liquid mercury.

A vibrating body 19 is attached to the upper end cap 9. The vibrating body oscillates in the direction indicated by arrow 21. A body 23 to be isolated from the vibration (the "isolated body") of the vibrating body 19 is connected to the piston 5 by means of a bracket 25 and lugs 27. The oscillatory force produced by the vibrating body 19 in the direction 21 causes relative motion between the piston 5 and the cylinder 7. That relative motion creates an oscillatory reaction force due to strain in the rubber spring 3. At the same time, the volumes of the chambers 13, 15 are alternately increased and decreased, and the liquid contained in the chambers 13, 15 and the tuning passage 17 is pumped back and forth between the chambers 13, 15 through the tuning passage 17. The inertial mass of the liquid in the tuning passage 17 (the "tuning mass") is amplified by the ratio of the effective cross-sectional area of the piston 5 and rubber spring 3 (the "effective piston area") to the cross-sectional area of the tuning passage 17 (the "tuning passage area"). The inertial force created by acceleration of the tuning mass is out of phase with the reaction force of the rubber spring 3. In a system with no damping, at some frequency (the "isolation frequency"), the inertial force becomes equal and opposite to the spring force, complete force cancellation occurs, and no vibration is transferred to the isolated body 23. In a system having damping, complete force cancellation does not occur, but minimum transfer of vibration to the isolated body occurs at the isolation frequency. The isolation frequency for the vibrating body-LIVE isolator-isolated body system; $f_i$ is calculated as follows:

$$f_i = \frac{1}{2\pi}\sqrt{\frac{k}{R(R-1)LA\rho}},$$

k=the spring rate of the rubber spring;
R=the ratio of the effective piston area to the tuning passage area;
L=the length of the tuning passage;
A=the tuning passage area; and
ρ=the mass density of the liquid.

As the isolation effect of the LIVE isolator is dependent on the inertial effect caused by pumping the liquid, the LIVE isolator is effective only along an axis which is perpendicular to, and passes through the geometric center of, the effective piston area (the "operating axis"). Thus, when a vibration force is applied to a LIVE isolator 1 along other than the isolator's operating axis, only the component of the vibration force along the operating axis is isolated.

Curve 27 in FIG. 2 shows a plot of the frequency response of the isolated body 25 along the operating axis of the LIVE oscillator 1. The curve 27 is for a system having approximately one percent critical damping. Line 29 represents the response of the isolated body 25 along the operating axis for an equivalent rigid-body system. As can be seen, a relatively narrow isolation "notch" 30 in the curve 27 occurs in the vicinity of the isolation frequency, $f_i$ (also known as the antiresonance frequency). Maximum isolation (minimum isolated body response) is 99% at the isolation frequency; that is, only 1% of the vibrating body force is transferred to the isolated body at the isolation frequency.

The Halwes LIVE isolator 1 is rugged, compact, lightweight, self-contained, and provides excellent vibration isolation along its operating axis for vibration near the isolation frequency of the vibrating body-LIVE isolator-isolated body system.

Other inertial isolators are known in the art. See, for example, U.S. Pat. No. 4,811,919 (Jones) and U.S. Pat. No. 5,174,552 (Hodgson et al.), each of which show inertial isolators having an external tuning passage. However, in each inertial isolator other that the Halwes LIVE isolator, the configuration of the tuning passage is such that it presents a greater resistance to liquid flow than in the LIVE isolator.

That flow resistance increases the damping of the isolator, which decreases the isolator's effectiveness.

D. R. Halwes, "Total Main Rotor Isolation System," Bell Helicopter Textron Inc. (1981) and D. R. Halwes, "Controlling the Dynamic Environment During NOE Flight," Bell Helicopter Textron Inc. (1985) describes a six degree of freedom ("6 DOF") helicopter pylon isolation system. The system uses six LIVE isolator links to attach the pylon to the fuselage and to isolate b/rev vibration in all six degrees of freedom.

Although the 6 DOF system provides b/rev isolation that is superior to that of previous systems, it has several shortcomings. First, to ensure that each LIVE isolator is exposed only to forces along its operating axis, each LIVE isolator link is pinned at each of its ends by means of elastomeric bearings. In addition to being expensive, the elastomeric bearings introduce additional damping into the pylon-LIVE isolator-fuselage system, which decreases the effectiveness of the isolators.

Second, since the effectiveness of a LIVE isolator decreases markedly as isolation frequency varies from the vibration frequency, relatively minor changes in the 6 DOF system which effect the isolation frequency produce a relatively large decrease in the system's effectiveness. Such changes include: changes in the isolators and elastomeric bearings due to aging; changes in the properties of the rubber springs, elastomeric bearings, and liquid due to the temperature variations; and variations between the system's isolators due to manufacturing tolerances. In addition, a helicopter's main rotor is often operated at other than its nominal rotational speed, resulting in a mismatch between the main rotor b/rev frequency and the 6 DOF system's isolation frequency, which decreases the isolators' effectiveness. A means for adjusting the 6 DOF system's isolators during operation to compensate for such changes and to match the system's isolation frequency to the main rotor b/rev frequency would allow the system to provide optimal b/rev isolation at all times.

The isolation frequency of a system which includes a LIVE or other inertial isolator can be changed by changing the length or the cross-sectional area of the isolator's inertial passage. For example, see U.S. Pat. No. 4,969,632 (Hodgson et al.) and U.S. Pat. No. 4,641,808 (Flower). However, the prior art means for effecting such changes significantly increase isolator damping, which decreases the isolator's effectiveness. A means for changing isolator inertial passage length or cross-sectional area without significantly increasing damping would allow the system's isolation frequency to be changed while maintaining high isolator effectiveness.

Third, the 6 DOF system is relatively space-consuming. A more compact system would save both space and weight.

SUMMARY OF THE INVENTION

A vibration isolation system for a helicopter comprises four tunable dual-axis LIVE isolators, an array of accelerometers, and a controller. The controller inputs signals from the accelerometers and outputs signals to tune the isolators to minimize the vibration transmitted from the helicopter's pylon to its passenger compartment.

The tunable dual-axis isolators each comprise two single-axis LIVE isolators connected together with their operating axes perpendicular to each other. In the preferred embodiment, each single-axis isolator is tuned by means of an axially extendable sleeve which forms a part of the inner wall of the isolator's tuning passage. An electric motor, acting through a rack and pinion gear train, extends and retracts the sleeve, thereby decreasing or increasing, respectively, the isolation frequency of the single-axis isolator.

The isolator system provides vibration isolation in all six degrees of freedom. The vibration isolator comprises a first and second fluid-filled chambers and a fluid-filled tuning passage connecting the chambers; a piston including a first end for varying the volume of the first chamber and a second end for varying the volume of the second chamber, variation of the volumes being responsive to relative motion between a vibrating body and an isolated body along a piston axis; a longitudinally-extending slot in a wall of the tuning passage, the slot being substantially longitudinally coextensive with the tuning passage; and a substantially rigid tuning member at least partially disposed in the slot, the tuning member being substantially longitudinally coextensive with the slot and transversely movable relative to the tuning passage.

BRIEF DESCRIPTION OF THE DRAWINGS

An embodiment of the invention will be described, by way of example only, with reference to the accompanying drawings, in which:

FIG. 3 is a sectional side view of a tunable dual-axis LIVE isolator in accordance with the present invention;

FIG. 4 is a sectional view of the isolator taken through plane 4—4 in FIG. 3;

FIG. 5 is an enlarged sectional side view of the vertical tuning passage of the isolator of FIGS. 3 and 4;

FIG. 6 a sectional view of the sleeve-actuation means taken through plane 6—6 in FIG. 5;

FIG. 7 is a sectional side view of an alternate means for tuning the isolator;

FIG. 8 is a sectional view of the alternate tuning means taken through plane 8—8 in FIG. 7;

FIG. 9 is a top view of the alternate tuning means of FIGS. 7 and 8, shown with the radially movable member in its most inward position;

FIG. 10 is a top view of the alternate tuning means of FIGS. 7 and 8, shown with the radially movable member at its most outward position;

FIG. 11 is a sectional side view of another alternate means for tuning the isolator;

FIG. 12 is a sectional view of the alternate means of FIG. 11 taken through plane 12—12;

FIG. 13 is a side view of a vibration isolation system for a helicopter pylon which includes four tunable dual-axis isolators;

FIG. 14 is a top view of the vibration isolation system of FIG. 13;

FIG. 15 is a top view of a vibration isolation system for a helicopter pylon which includes three tunable dual-axis isolators;

FIG. 16 is a top view of a five-degree-of-freedom vibration isolation system for a helicopter pylon which includes three tunable dual-axis isolators;

FIG. 17 is a diagrammatic representation of the cruciform member and rubber springs of the isolators shown in FIGS. 3 and 4;

FIG. 18 is a diagrammatic perspective view of the vibration isolation system of FIGS. 13 and 14 showing the system's vertical spring rates;

FIG. 19 is a diagrammatic top view of the vibration isolation system of FIGS. 13 and 14 showing the system's spring rates in the horizontal plane; and FIG. 20 is a block diagram of the control system for the helicopter pylon vibration isolation system.

DETAILED DESCRIPTION

Figure 1:
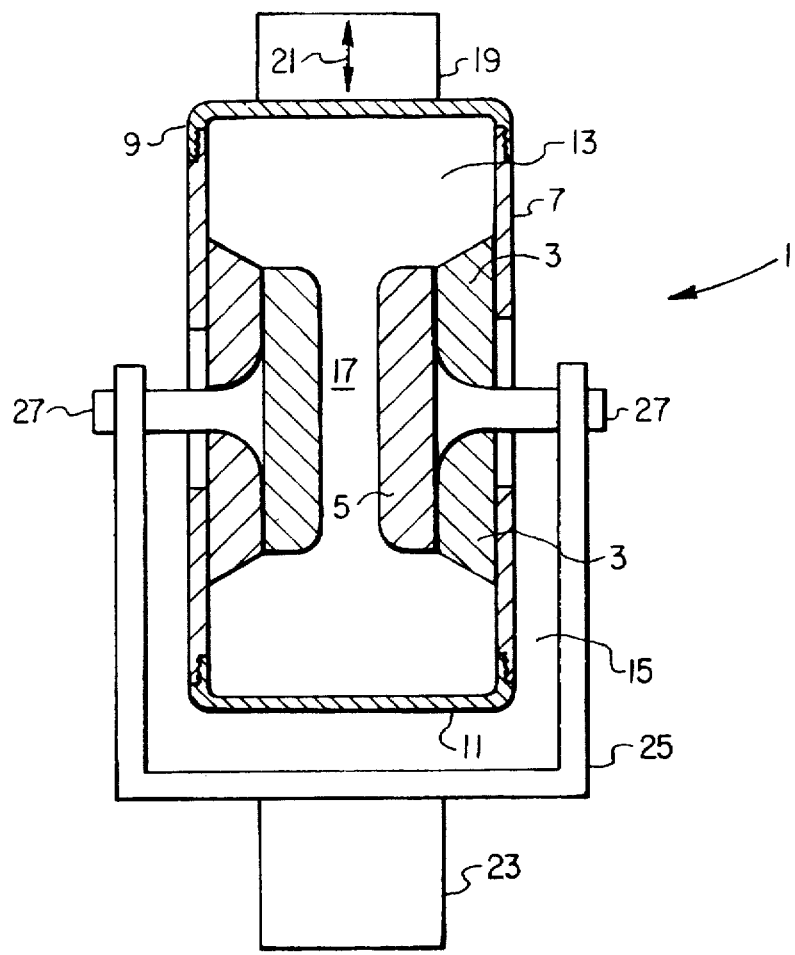
FIG. 1 is a side sectional view of the prior art Halwes LIVE isolator.

FIGS. 3 and 4 are sectional views of a tunable dual-axis LIVE isolator 31 embodying the present invention. The dual-axis isolator 31 comprises a vertical single-axis isolator 33 and a horizontal single-axis isolator 35 having their operating axes 37, 39, respectively, disposed substantially orthogonally to each other. A cruciform member 41 serves as pistons for both the single-axis isolators 33, 35. A rubber spring 43 is bonded to an outer surface of an upper portion 45 of the cruciform member 41 and an inner surface of an upper cap 47, thereby forming an upper chamber 49. Another rubber spring 51 is bonded to an outer surface of a lower portion 53 of the cruciform member 41 and to an inner surface of a lower cap 55, forming a lower chamber 57. Similarly, a rubber spring 59, a left portion 61 of the cruciform member 41, and a left cap 63 form a left chamber 65; and a rubber spring 67, a right portion 69 of the cruciform member 41, and a right cap 71 form a right chamber 73.

It will be appreciated that the upper and lower caps 47, 55 must be restrained from moving relative to each other for the vertical isolator 33 to function as a LIVE isolator. When so restrained, the caps 47, 55 perform the same functions as the cylinder 7 and end caps 9, 11 shown in FIG. 1. Similarly, the left and right caps 63, 71 must be restrained from moving relative to each other for the horizontal oscillator 35 to function as a LIVE isolator. As described below in connection with FIGS. 13 and 14, the caps 47, 55, 63, 71 are so restrained by structures which are not shown in FIGS. 3 and 4.

The dual-axis isolator of this embodiment of the invention are essentially two single-axis LIVE isolators attached together with their operating axes at an angle to each other. Preferably the pistons of the single-axis isolators are attached together, but it will be appreciated that other parts of the isolators can be attached, such as the piston of one isolator to the caps of the other isolator, or the caps of one isolator to the caps of the other isolator. Although the operating axes of the single-axis isolators are preferably perpendicular to each other, this is not required. So long as the axes are at some angle to each other, i.e., not parallel, the dual-axis isolator will function to isolate vibration in two axes. Finally, while the isolators used in this embodiment of the invention are Halwes LIVE isolators, it will be appreciated that any inertial isolator can be used. Further, it will be apparent to those skilled in the art that three single-axis isolators can be connected together with the operating axis of each isolator at an angle to the operating axes of the two other isolators, thereby forming a three-axis isolator.

A vertical tuning passage 75 through the cruciform member 41 connects the upper and lower chambers 49, 57. The tuning passage 75 and chambers 49, 57 are filled with liquid through a removable plug 77 in the upper cap 47. Similarly, a horizontal tuning passage 79 through the cruciform member 41 connects the left and right chambers 63, 71. The tuning passage 79 and chambers 63, 71 are filled with liquid through a removable plug 81 in the right cap 71.

To minimize damping, the rubber springs 43, 51, 59, 67 are constructed of low-damped, broad temperature rubber. In addition, the inlets to the tuning ports 75, 79 are carefully designed to ensure smooth flow of the liquid.

Although mercury is an ideal fluid for a LIVE isolator in some respects, it has two serious shortcomings: it is toxic and it is corrosive. For that reason, this embodiment of the invention uses a low-viscosity, incompressible, environmentally-safe liquid. Although the liquid is not as dense as mercury, resulting in a somewhat larger isolator 31, the liquid is neither toxic nor corrosive.

The vertical and horizontal tuning passages 75, 79 each includes an axially-extendable, slidable sleeve 83, 85, respectively, for tuning the respective isolator 33 or 35 to a range of isolation frequencies. The slidable sleeves 83, 85 are shown in their fully-extended positions in FIGS. 3 and 4.

Refer now to FIGS. 5 and 6. The vertical sleeve 83 is slidably disposed within a vertical orifice 87 in the cruciform member 41. Thus, the vertical passage 75 is formed by the inner surface of the sleeve 83 and a portion of the inner surface of the orifice 87. When the sleeve is fully retracted, its upper end 89 is disposed within a complimentary-shaped recess 91 in an upper surface 93 of the cruciform member 41.

To minimize damping, the upper end 89 and the lower end 95 of the sleeve 83 are shaped to ensure smooth fluid flow. In addition, to minimize the effect on isolation frequency due to the difference between the inside diameters of the sleeve 83 and the orifice 87, the wall thickness of the sleeve 83 is as thin as possible, consistent with adequate strength.

An axially-extending rack gear 97 is attached to an outer surface of the sleeve 83 by suitable means, such as by bonding or conventional fasteners. Alternately, the rack gear 97 may be an integral portion of the sleeve 83. A suitably-shaped and suitably-dimensioned void 99 is provided in the inner surface of the orifice to allow axial movement of the rack gear 97 to the extent required to move the sleeve 83 between its fully-extended and fully-retracted positions. A pinion gear 101 engages the rack gear 99. The pinion gear is connected to an output shaft 103 of a small electric motor 105. When the motor 105 rotates the pinion 101, the rack gear 97 moves axially, extending or retracting the sleeve 83. While an electric motor is used in this embodiment, any suitable rotary actuator, such as one powered by hydraulic or pneumatic pressure, may be used. Further, this feature of the invention is not limited to positioning the sleeve 83 by means of the described rotary actuator-gear system. Any suitable means for extending and retracting the sleeve 83, such as a linear actuator, is included within the scope of the invention.

The electric motor 105 and, thus, the position of the sleeve 83, is controlled by a control system which responds to vibration. The control system is discussed below in connection with FIG. 20.

The slidable sleeve 85 included in the horizontal tuning passage 79 is actuated by another electric motor 107 (FIG. 4) in the same manner as described above.

As the isolation frequency along the operating axis of a LIVE isolator is inversely related to the square root of the volume of the isolator's tuning passage, extending or retracting a sleeve 83 or 85 decreases or increases, respectively, the isolation frequency of the respective single-axis isolator 33, 35. Thus, the sleeves 83, 85 provide a means to tune the vertical and horizontal isolators 33, 35 to a range of isolation frequencies.

FIGS. 7–10 illustrate an alternate means for tuning the single-axis isolators 33, 35 shown in FIG. 3 and 4. For clarity, only the piston of the vertical isolator 33 is shown.

The inner surface of a radially movable member 109 forms a portion of the wall of the vertical passage 75. The adjustable member 109 is slidably disposed within a vertical channel or slot 110 in the vertical piston 33. An upper extension 111 of the adjustable member 109 is slidably disposed within an upper horizontal recess 112 in the upper surface of the vertical piston 33. Similarly, a lower extension 113 of the adjustable member 109 is slidably disposed in a lower horizontal recess 114.

A threaded output shaft 116 of an electric motor 117 engages a threaded blind orifice 118 in the movable member 109. When the motor 117 is operated, the output shaft 116 cooperates with the blind orifice 118 to move the movable member inwardly or outwardly relative to the vertical axis of the passage 75. FIGS. 9 and 10 show the movable member 109 in its most inward and most outward positions, respectively.

An orifice 115 in the upper horizontal extension 111 allows liquid to enter and exit the portion of the channel 110 not occupied by the movable member 109. Thus, the volume available for liquid within the vertical isolator 33 remains substantially constant as the movable member is moved inwardly and outwardly. It will be appreciated that the orifice 115 can be located in the lower horizontal extension 113, rather than in the upper horizontal extension 111. However, to preclude transfer of liquid between the upper and lower reservoirs 13, 15 through the vertical channel 110, only one of the horizontal extensions 111, 113 includes an orifice 115.

Recall the equation for isolation frequency:

$$f_i = \frac{1}{2\pi} \sqrt{\frac{k}{R(R-1)LA\rho}},$$

k=the spring rate of the rubber spring;
R=the ratio of the effective piston area to the tuning passage area;
L=the length of the tuning passage;
A=the tuning passage area; and
ρ=the mass density of the liquid.
Defining R=B/A, where B=the effective piston area, allows the isolation frequency to be expressed as follows:

$$f = \frac{1}{2\pi} \sqrt{\frac{k}{\left(\frac{B^2-BA}{A^2}\right)LA\rho}} = \frac{1}{2\pi} \sqrt{\frac{k}{\left(\frac{B^2}{A}-B\right)L\rho}}$$

Thus, decreasing the cross-sectional area, A, of the vertical passage 75 by moving the movable member 109 inwardly decreases the isolation frequency of the vertical isolator 33; and increasing the cross-sectional area by moving the movable member 109 outwardly increases the isolation frequency. As a similar structure is provided for the horizontal isolator 35 (FIGS. 3 and 4), the vertical and horizontal isolators 33, 35 can be tuned to a range of isolation frequencies.

FIGS. 11 and 12 illustrate another alternate means for tuning the single-axis isolators 33, 55 (FIGS. 3 and 4). For clarity, only the piston of the vertical isolator 33 is shown.

An electromagnetic coil 116 is disposed around the tuning passage 75. When an electrical voltage is applied across terminals 117, 118, current flows in the coil 116, thereby generating a magnetic field in the tuning passage 75. Depending on the polarity of the voltage applied to the terminals 117, 118, the direction of the magnetic field is one of the directions indicated by the two-headed arrow 119. In this embodiment, the liquid filling the passage 75 and the upper and lower chambers 49, 53 (FIG. 3) is an electrolytic solution (i.e., an ionized liquid, such as saline solution) or an electrically-conducting liquid metal such as mercury. Magnetohydrodynamic ("MHD") force acts upon the liquid in the tuning passage 75 when the coil 116 is activated. The magnitude and direction of the MHD force is dependent upon the magnitude and direction of the current flowing through the coil 116.

Applying an alternating voltage to the terminals 117, 118 produces an alternating MHD force. The MHD force can be phased to coincide with the displacement of the liquid in the tuning passage 75, thereby causing an apparent decrease in the liquid's mass. Referring again to the equation for isolation frequency, it will be appreciated that a decrease in the apparent mass of the liquid in the tuning passage 75 results in an increased isolation frequency. Likewise, phasing the MHD force to coincide with the acceleration of the liquid in the tuning passage causes an apparent increase in the liquid's mass, which decreases the isolation frequency. The amount of increase or decrease in the isolation frequency depends on the magnitude of the current flowing through the coil 116.

Figure 2:
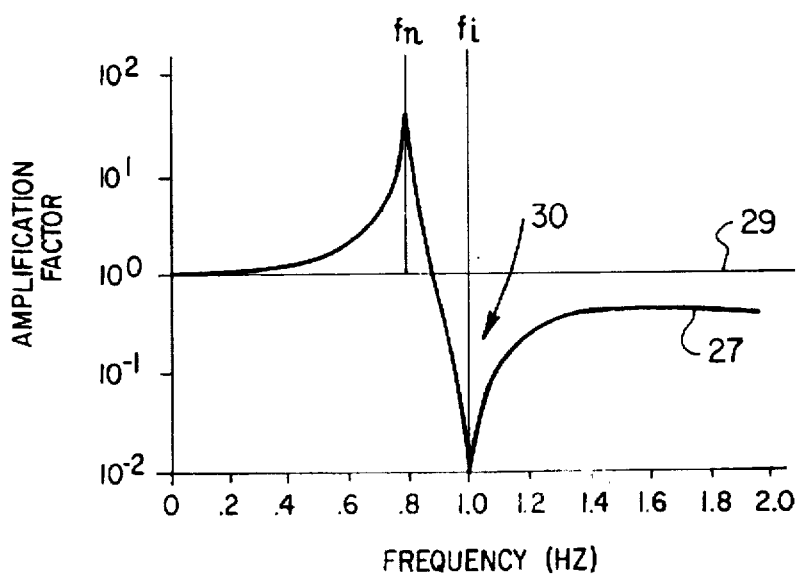
FIG. 2 is a plot of the frequency response of an isolated body along the effective axis of a LIVE isolator.

Alternately, the MHD force can be phased to coincide with the velocity of the liquid in the tuning passage 75, thereby adding kinetic energy to the liquid to compensate for the energy dissipated due to viscous damping losses. As a result, the depth of the isolation notch 20 (FIG. 2) increases, providing greater isolation.

FIGS. 13 and 14 illustrate a vibration isolation system for a helicopter pylon (the main rotor-transmission assembly) which includes four tunable dual-axis isolators 127-133. Each isolator 127-133 is identical to the isolator 31 described in connection with FIGS. 3-6.

A main rotor transmission 121 receives power from one or more engines (not shown) through a drive shaft 123. The transmission 121 transfers power to a main rotor (not shown) through a mast 125.

The dual-axis isolators 127-133 are attached to the transmission 121 by four means of four brackets 135-141, respectively. The upper and lower caps 47, 55 (FIG. 1) of each isolator 127-133 is attached to a respective vertical bracket 135-141, and the brackets 135-141 are attached to the transmission 121. The brackets 135-141 also restrain the upper and lower caps 47, 55 from moving relative to each other, thereby allowing them to function in the manner of the cylinder 7 in FIG. 1. The isolators 127-133 are attached to an upper deck 143 of a helicopter fuselage (not shown) by means of four stands 145-151. The left and right caps 63, 71 (FIGS. 3 and 4) of each isolator 127-133 is attached to a respective stand 145-151, and the stands 145-151 are attached to the upper deck 143.

It will be appreciated that attaching the upper and lower caps 47, 55 to the upper deck 143 and attaching the left and right caps 63, 71 to the transmission 121 is equivalent to the configuration described above in connection with FIGS. 13 and 15. In either configuration, pylon vertical shears, roll moments, and pitch moments are isolated from the fuselage by the vertical isolator portions 33 (FIGS. 3 and 4) of the dual-axis isolators 127-133; and pylon longitudinal shears, lateral shears, and yaw moments are isolated from the fuselage by the horizontal isolator portions 35 of the isolators 127-133. Thus, either configuration of the described isolation system provides vibration isolation in all six degrees of freedom.

It will be appreciated that a minimum of three dual-axis isolators 31 (FIGS. 3 and 4) are required to provide an isolation system that is statically stable in all six degrees of freedom. Such a system is shown schematically in FIG. 15. The three dual-axis isolators 153–157 and associated mounting structure (not shown) provide a system which is statically stable in all six degrees of freedom and which provides isolation in all six degrees of freedom.

The isolation system illustrated in FIG. 16 provides isolation in five degrees of freedom. The effective axes (indicated by arrows 167) of the horizontal isolator portions 35 (FIGS. 3 and 4) of the dual-axis isolators 161–165 are aligned with transmission radii 169. Thus, vibration force applied to the isolators 161–165 due to a yaw moment 171 is perpendicular to the operating axes of the vertical and horizontal isolator portions 33, 35, respectively, of the isolators 161–165. Therefore, the yaw moment will not be isolated.

The isolation frequency for a pylon-isolator-fuselage system may be calculated as follows:

$$f_u = \frac{1}{2\pi} \sqrt{\frac{k_s}{R_s(R_s-1)m_s}},$$

$k_s$=effective spring rate of the system parallel to the vibration force being isolated;

$R_s$=the ratio of the effective piston area to the tuning passage area for those isolators whose operating axes are parallel to a component of the vibration force being isolated;

$m_s$=the sum of the tuning masses parallel to a component of the vibration force being isolated (the "effective tuning masses").

For each single-axis isolator portion of each dual-axis isolator, the effective tuning mass may be calculated as follows:

$$m = L A \rho \cos \Theta,$$

where
L=the length of the tuning passage of the single-axis isolator;
A=the tuning passage area of the single-axis isolator;
$\rho$=the mass density of the liquid; and
$\Theta$=the angle between the vibration force and the operating axis of the single-axis isolator.

If the present system included only one isolator, and the vibration force were acting along the isolator's operating axis, the preceding two equations would yield the equation for isolation frequency disclosed in Halwes. Unlike the system described in Halwes, however, the present invention includes more than one isolator and is exposed to vibration in all six degrees of freedom. Therefore, it is necessary to calculate the effective spring rates and tuning masses for each degree of freedom.

FIG. 17 is a diagrammatic representation of the cruciform member 41 and the rubber springs 43, 51, 59, 67 described above in connection with FIGS. 3 and 4. Due to the geometry of the rubber springs and the inherent properties of the rubber used in their construction, the spring rates of the springs depend on the direction in which the springs are strained. The spring rates of each spring are denoted $k_1$, $k_2$, and $k_3$. In this embodiment, the value of $k_1$ is approximately one-half the value of $k_2$. Were it not for a series of shims 191 which are molded into each rubber spring, $k_2$ would be equal to $k_3$. Due to the shims 191, the value of $k_3$ is approximately 30 times the value of $k_2$.

The spring rates $k_1$, $k_2$, and $k_3$ of each rubber spring 43, 51, 59, 67 effect the effective spring rates of the cruciform member 41. The effective spring rates $k_V$, $k_T$ and $k_R$ of the cruciform member 41 are calculated as follows:

$$k_V = k_T = \frac{1}{\frac{1}{2k_1} + \frac{1}{2k_3}};$$

and $$k_R = \frac{1}{\frac{1}{2k_2} + \frac{1}{2k_2}} = k_2.$$

When calculating effective spring rates and effective tuning masses, a transmission mount plane 193 (FIGS. 18 and 19) provides a convenient coordinate system. The operating axes 37, 39 (FIG. 3) of each dual-axis isolator intersect. The transmission mount plane 193 is the plane which passes through the operating-axes intersection of each of the dual-axis isolators 127–133 (FIGS. 11 and 12).

Referring now to FIGS. 18 and 19, the effective spring rates of the isolator system (FIGS. 13 and 14) parallel to the z axis (vertical relative to the transmission horizontal mount plane 193), the x axis (longitudinal), and the y axis (lateral) are:

$$k_z = 4k_V;$$

and $$k_x = k_y = 4(k_R + k_T) \cos 45.$$

Since mount-plane roll and pitch moments resolve to forces along the isolators' vertical operating axes, and mount plane yaw moments resolve to forces along the isolators' horizontal operating axes.

$$k_{pitch} = k_{roll} \alpha 4 k_V;$$

and $$k_{yaw} \alpha 4 k_T.$$

Since the mount-plane vertical forces and the forces due to mount-plane roll and pitch moments act along the dual-axis isolators' vertical operating axes (and perpendicular to the isolators' horizontal axes), only the vertical tuning masses affect the system's isolation frequency in the mount-plane vertical, roll, and pitch degrees of freedom; and, when calculating the effective tuning masses for the vertical, roll, and pitch degrees of freedom, $\Theta=0°$. Since mount-plane forces along the x and y axes act at an angle of 45° to the dual-axis isolators' horizontal operating axes (and perpendicular to the isolators' vertical axes), only the horizontal tuning masses affect the system's isolation frequency in the longitudinal and lateral degrees of freedom, and $\Theta=45°$. Finally, since the forces due to mount-plane yaw moments act along the dual-axis isolators' horizontal axes (and perpendicular to the isolators' vertical axes), only the horizontal tuning masses affect the system's isolation frequency in the yaw degree of freedom, and $\Theta=0°$.

FIG. 20 is a block diagram of the control system included in this embodiment of the invention to tune the dual-axis isolators to achieve optimal isolation of pylon b/rev vibration from the helicopter's fuselage. A sensor array 201 for sensing fuselage vibration provides a series of signals representing the vibration to a controller 203. In response to the vibration sensor signals, the multi-input/multi-output controller 203 generates signals which are routed to the isolator actuators 205 (the electric motors 105, 107 in FIG. 3), which act to tune the system's isolators. Tuning the isolators changes the physical characteristics of the pylon-isolator-fuselage system 207, which changes the vibration sensed by the sensor array 201.

In this embodiment, the vibration-sensing array comprises six accelerometers disposed to sense vibration in all six degrees of freedom. Alternately, an array of other suitable sensors, such as strain gages, could be used. Because an important object of the present invention is to provide the helicopter's passengers with a vibration-free ride, the sensor array 201 is located in the helicopter's passenger compartment.

The controller 203, responds to the signals from the sensor array 201 to develop output signals which cause appropriate isolator actuators 205 to move the corresponding isolator tuning sleeves 83, 85 (FIGS. 3–6), or the alternate tuning means described in connection with FIGS. 7–12, thereby changing the system's isolation frequency in one or more degrees of freedom. Such changes change the characteristics of the pylon-isolator-fuselage system 207, resulting in an increase or a decrease in vibration in the corresponding degrees of freedom, which vibration is transmitted from the main rotor transmission to the fuselage and, thus, to the sensor array 201. As can seen, the control system is a closed-loop feedback system.

If a change in an isolation frequency results in an increase in the vibration in the corresponding degrees of freedom, that increase is sensed by the sensor array 201. As a result, the controller 203 acts to tune the corresponding system isolation frequency in the opposite direction. If the original change in isolation frequency decreases the vibration in the corresponding degrees of freedom, the controller continues to adjust the appropriate isolator tuning sleeves in the same direction until vibration in the corresponding degrees of freedom reaches a predetermined value or begins to increase. Discontinuing tuning at a predetermined value minimizes controller "hunting."

It will be appreciated that the sensors 201 respond to vibration from all sources, not just that originating in the pylon. As a result, the controller 203 tunes the isolators to minimize vibration at the passengers' seats, whatever the source of that vibration.

While a preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A dual-axis vibration isolator comprising:

first and second fluid-filled chambers;

a first piston having a first end for varying the volume of said first chamber and an opposed second end for varying the volume of said second chamber, said variation of said volumes being responsive to relative motion between a vibrating body and an isolated body along an axis of said first piston; and a first fluid-filled tuning passage connecting said first and second chambers;

third and fourth fluid-filled chambers;

a second piston having a first end for varying the volume of said third chamber and an opposed second end for varying the volume of said fourth chamber, said variation of said third and fourth chamber volumes being responsive to relative motion between said vibrating and isolated bodies along an axis of said second piston;

a second fluid-filled tuning passage connecting said third and fourth chambers;

at least one of said tuning passages including a longitudinally-extending channel;

a movable member disposed in said channel, said movable member being movable transversely of said tuning passage to vary the volume thereof and thereby vary an operating characteristic of the vibration isolator; and one of said first and second chambers and said first piston being connected to one of said third and fourth chambers and said second piston such that said first piston axis is disposed at an angle to said second piston axis.

2. The vibration isolator of claim 1 further comprising an actuator for moving said movable wall portion.

3. A vibration isolator comprising:

first and second fluid-filled chambers and a fluid-filled tuning passage connecting the chambers;

a piston including a first end for varying the volume of the first chamber and a second end for varying the volume of the second chamber, variation of the volumes being responsive to relative motion between a vibrating body and an isolated body along a piston axis;

a longitudinally-extending slot in a wall of the tuning passage, the slot being substantially longitudinally coextensive with the tuning passage; and a substantially rigid tuning member at least partially disposed in the slot, the tuning member being substantially longitudinally coextensive with the slot and transversely movable relative to the tuning passage.

4. The vibration isolator of claim 3 further comprising an actuator for moving the tuning member.

5. The vibration isolator of claim 3 further comprising a control system for the tuning member, which control system is responsive to vibration of the isolated body or the vibrating body substantially parallel to the piston axis.

6. A vibration isolator comprising:

first and second fluid-filled chambers and a fluid-filled tuning passage connecting the chambers;

a piston including a first end for varying the volume of the first chamber and a second end for varying the volume of the second chamber, variation of the volumes being responsive to relative motion between a vibrating body and an isolated body along a piston axis;

a longitudinally-extending slot in a wall of the tuning passage; and a tuning member at least partially disposed in the slot, the tuning member being substantially longitudinally coextensive with the slot and transversely movable with respect to the tuning passage.

7. The vibration isolator of claim 6 wherein the slot is substantially longitudinally coextensive with the tuning passage.

8. The vibration isolator of claim 7 wherein the tuning member is substantially laterally coextensive with the slot.

9. The vibration isolator of claim 7 wherein the tuning member is substantially rigid.

10. The vibration isolator of claim 6 wherein the length of the slot is at least a portion of the length of the tuning passage.

11. The vibration isolator of claim 10 wherein the tuning member is substantially laterally coextensive with the slot.

12. The vibration isolator of claim 10 wherein the tuning member is substantially rigid.

13. The vibration isolator of claim 6 wherein the tuning member is substantially laterally coextensive with the slot.

14. The vibration isolator of claim 6 wherein the tuning member is substantially rigid.

* * * * *